US012737596B2

(12) United States Patent
Regikumar et al.

(10) Patent No.: US 12,737,596 B2
(45) Date of Patent: Sep. 15, 2026

(54) EFFICIENT EXTENDED KALMAN FILTER (EKF) UNDER FEED-FORWARD APPROXIMATION OF A DYNAMICAL SYSTEM

(71) Applicant: Tata Consultancy Services Limited, Mumbai (IN)

(72) Inventors: Rohith Regikumar, Chennai (IN); Avinash Achar, Chennai (IN); Akshaya Natarajan, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 1045 days.

(21) Appl. No.: 17/815,222

(22) Filed: Jul. 27, 2022

(65) Prior Publication Data

US 2023/0289574 A1 Sep. 14, 2023

(30) Foreign Application Priority Data

Mar. 11, 2022 (IN) ............................ 202221013456

(51) Int. Cl.
*G06N 3/048* (2023.01)

(52) U.S. Cl.
CPC .................................. *G06N 3/048* (2023.01)

(58) Field of Classification Search
CPC .............................. G06N 3/048; G06N 3/084
See application file for complete search history.

(56) References Cited

U.S. PATENT DOCUMENTS

| | | | |
|---|---|---|---|
| 7,130,342 | B2 | 10/2006 | Buckley et al. |
| 7,734,466 | B2 | 6/2010 | Barron et al. |
| 2006/0075273 | A1 | 4/2006 | Deng |

OTHER PUBLICATIONS

Bai, Guangxing, et al. “A generic model-free approach for lithium-ion battery health management.” Applied Energy 135 (2014): 247-260. (Year: 2014).*

Psiaki, Mark L. “Backward-smoothing extended Kalman filter.” Journal of guidance, control, and dynamics 28.5 (2005): 885-894. (Year: 2005).*

(Continued)

*Primary Examiner* — Schyler S Sanks

(74) *Attorney, Agent, or Firm* — Finnegan, Henderson, Farabow, Garrett & Dunner LLP

(57) ABSTRACT

An Extended Kalman filter (EKF) is a general nonlinear version of the Kalman filter and an approximate inference solution which uses a linearized approximation performed dynamically at each step and followed by linear KF application. Extended Kalman Filter involves dynamic computation of the partial derivatives of the non-linear functions system maps with respect to the input or current state. Existing approaches have failed to perform recursive computations efficiently and exactly for such scenarios. Embodiments of the present disclosure efficient forward and backward recursion-based approaches wherein a forward pass is executed through a feed-forward network (FFN) to compute a value that serves as an input to $j^{th}$ node at a layer l from a plurality of network layers of the FFN and partial derivatives are estimated for each node associated with various network layers in the FFN. The feed-forward network is used as state and/or observation equation in the EKF.

17 Claims, 3 Drawing Sheets

(56) References Cited

OTHER PUBLICATIONS

Eftychios A. Pnevmatikakis et al., "Fast Kalman Itering and forward-backward smoothing via a low-rank perturbative approach," Journal of Computational and Graphical Statistics, 2012, vol. 23 (2), pp. 316-339, Taylor & Francis Online, http://www.stat.columbia.edu/~liam/research/pubs/fast-low-rank-kalman.pdf.

* cited by examiner obtaining, a feed-forward network (FFN), wherein the FFN comprises a plurality of network layers, wherein each of the plurality of network layers comprises one or more nodes

202 recursively computing in a first direction, a partial derivative at each node of the plurality of network layers comprised in the FFN by: identifying a recursive relationship between outputs associated with two successive network layers from the plurality of network layers, wherein the recursive relationship is identified using the equation: $y_j^{l+1}(x) = S\left(\sum_{i=1}^{n_l} w_{ij}^l\, y_i^l(x) + \omega_{0j}^l\right)$, wherein $y_j^{l+1}$ is an output of $j^{th}$ node at layer $l+1$ from the plurality of network layers of the FFN, $S$ is a continuously differentiable activation function , $n_l$ is number of nodes associated with a layer $l$ from the plurality of network layers of the FFN, $i$ is an iteration number, $w_{ij}^l$ is a weight between $i^{th}$ node of the layer $l$ and $j^{th}$ node of the layer $l$+1, $y_i^l$ is an output of the $i^{th}$ node of the layer $l$, and $\omega_{0j}^l$ is a bias for $j^{th}$ node from the layer $l$; and applying a partial derivative function on the equation associated with the identified recursive relationship, with reference to a specific input $x_q$, to obtain a set of partial derivatives, wherein the partial derivative function is applied on the equation associated with the identified recursive relationship, using the equation: $\frac{\partial y_j^{l+1}}{\partial x_q} = S'\left(\eta_j^{l+1}\right)\left(\sum_{i=1}^{n_l} w_{ij}^l \frac{\partial y_j^l}{\partial x_q}\right)$, wherein $\eta_j^{l+1} = \sum_{i=1}^{n_l} w_{ij}^l\, y_i^l(x) + \omega_{0j}^l$ serves as an input to the $j^{th}$ node at the layer $l+1$, and $S'$ is a derivative of the continuously differentiable activation function .

EFFICIENT EXTENDED KALMAN FILTER (EKF) UNDER FEED-FORWARD APPROXIMATION OF A DYNAMICAL SYSTEM

PRIORITY CLAIM

This U.S. patent application claims priority under 35 U.S.C. § 119 to: Indian Patent Application No. 202221013456, filed on Mar. 11, 2022. The entire contents of the aforementioned application are incorporated herein by reference.

TECHNICAL FIELD

The disclosure herein generally relates to feed-forward networks, and, more particularly, to efficient Extended Kalman filter (EKF) under feedforward approximation of a dynamical system.

BACKGROUND

The inference problem in a non-linear dynamical system (NLDS) is to predict an unobserved state variable X(k), given the observations Y(k), initial state and inputs u(k). In particular, it is posed as an optimal filtering problem where X(k0) is estimated in a recursive fashion, given observations and inputs up to some k0. To perform inference or predictions optimally (in a minimum mean-square error sense (MMSE)) under such NLDS models, exact methods are unavailable. An Extended Kalman filter (EKF) is one popular approximate inference solution which is very efficient run-time wise. It uses a linearized approximation (based on a Taylor series expansion) performed dynamically at each step and followed by linear KF application. The extended Kalman filter (EKF) is a general nonlinear version of the Kalman filter which linearizes about an estimate of the current mean and covariance. In the extended Kalman filter, the state transition and observation models do not need to be linear functions of the state but may instead be nonlinear differentiable functions.

EKF is employed across domains like signal processing (tracking applications), robotics (estimate position of a robot), transportation, etc. Typically, the non-linear maps governing the state and observations equations are based on the physics of the domain. In situations where the physics-based models are not good enough, universal function approximators such as Neural Networks can be alternatively used if data is available to learn from. The Extended Kalman Filter involves dynamic computation of the partial derivatives of the non-linear functions system maps with respect to the input or current state. Existing approaches have failed to perform recursive computations efficiently and exactly for such scenarios.

SUMMARY

Embodiments of the present disclosure present technological improvements as solutions to one or more of the above-mentioned technical problems recognized by the inventors in conventional systems.

For example, in one aspect, there is provided a processor implemented method comprising: obtaining, a feed-forward network (FFN) via one or more hardware processors, wherein the FFN comprises a plurality of network layers, wherein each of the plurality of network layers comprises one or more nodes; and recursively computing in a first direction, via the one or more hardware processors, a partial derivative at each node of the plurality of network layers comprised in the FFN by: identifying, via the one or more hardware processors, a recursive relationship between outputs associated with two successive network layers from the plurality of network layers, wherein the recursive relationship is identified using the equation:

$$y_j^{l+1}(x) = S\left(\sum_{i=1}^{n_l} w_{ij}^l y_i^l(x) + \omega_{0j}^l\right),$$

wherein $$y_j^{l+1}$$

is an output of $j^{th}$ node at layer l+1 from the plurality of network layers of the FFN, S is a continuously differentiable activation function, $n_l$ is number of nodes associated with a layer l from the plurality of network layers of the FFN, i is an iteration number, $$w_{ij}^l$$

is a weight between $i^{th}$ node of the layer l and $j^{th}$ node of the layer $$l+1,\ y_i^l$$

is an output of the $i^{th}$ node of the layer l, and $$\omega_{0j}^l$$

is a bias for $j^{th}$ node from the layer l; and applying a partial derivative function on the equation associated with the identified recursive relationship, with reference to a specific input $x_q$, to obtain a set of partial derivatives, wherein the partial derivative function is applied on the equation associated with the identified recursive relationship, using the equation:

$$\frac{\partial y_j^{l+1}}{\partial x_q} = S'\left(\eta_j^{l+1}\right)\left(\Sigma_{i=1}^{n_l} w_{ij}^l \frac{\partial y_j^l}{\partial x_q}\right),$$

wherein $$\eta_j^{l+1} = \sum_{i=1}^{n_l} w_{ij}^l y_i^l(x) + \omega_{0j}^l$$

serves as an input to the $j^{th}$ node at the layer l+1, and S' is a derivative of the continuously differentiable activation function.

In an embodiment, the method further comprises recursively computing, in a second direction via the one or more hardware processors, a partial derivative at each node among the one or more nodes of the plurality of network layers comprised in the FFN by using the equation:

$$\delta_j^l = \Sigma_{s=1}^{n_{l+1}} \frac{\partial y_r^L}{\partial \eta_s^{l+1}} \frac{\partial \eta_s^{l+1}}{\partial \eta_j^l} = \Sigma_{s=1}^{n_{l+1}} \delta_s^{l+1} w_{js}^l S'(\eta_j^l),$$

wherein $$y_r^L$$

is one or more $r^{th}$ outputs of the FFN, $$\delta_j^l$$

is the partial derivative of the one or more $r^{th}$ outputs ( $$(y_r^L)$$

of the FFN with reference to $$\eta_j^l$$

indicative of $$\frac{\partial y}{\partial \eta_j^l},$$

and $$\eta_s^{l+1}$$

is an output of $s^{th}$ node at the layer l+1.

In an embodiment, the steps of recursively computing, in the first direction and recursively computing, in the second direction, are preceded by executing a forward pass through the FFN to compute $$\eta_j^l,$$

and wherein $$\eta_j^l$$

serves as an input to the $j^{th}$ node at the layer l from the plurality of network layers of the FFN.

In an embodiment, the first direction and the second direction are different from each other.

In an embodiment, $$\partial \eta_s^{l+1} \text{ and } \partial \eta_j^l$$

are varied from one or more inputs at a final layer $$L(\eta_i^L)$$

to one or more corresponding inputs at a first layer $$M(\eta_i^M)$$

of the FFN in the second direction.

In an embodiment, an activation function at an input layer of the plurality of network layers comprised in the FFN is linear or non-linear.

In an embodiment, the feed-forward network (FFN) is used as at least one of a state equation and an observation equation in an Extended Kalman Filter (EKF).

In another aspect, there is provided a processor implemented system comprising: a memory storing instructions; one or more communication interfaces; and one or more hardware processors coupled to the memory via the one or more communication interfaces, wherein the one or more hardware processors are configured by the instructions to: obtain, a feed-forward network (FFN), the FFN comprising a plurality of network layers, wherein each of the plurality of network layers comprises one or more nodes; and recursively compute in a first direction, a partial derivative at each node of the plurality of network layers comprised in the FFN by: identifying, a recursive relationship between outputs associated with two successive network layers from the plurality of network layers, wherein the recursive relationship is identified using the equation:

$$y_j^{l+1}(x) = S\left(\sum_{i=1}^{n_l} w_{ij}^l y_i^l(x) + \omega_{0j}^l\right),$$

wherein $$y_j^{l+1}$$

is an output of $j^{th}$ node at layer l+1 from the plurality of network layers of the FFN, S is a continuously differentiable activation function, $n_l$ is number of nodes associated with a layer l from the plurality of network layers of the FFN, i is an iteration number, $$w_{ij}^l$$

is a weight between $i^{th}$ node of the layer l and $j^{th}$ node of the layer $$l+1,\ y_i^l$$

is an output of the $i^{th}$ node of the layer l, and $$\omega_{0j}^l$$

is a bias for $j^{th}$ node from the layer l; and applying a partial derivative function on the equation associated with the identified recursive relationship, with reference to a specific input $x_q$, to obtain a set of partial derivatives, wherein the partial derivative function is applied on the equation associated with the identified recursive relationship, using the equation:

$$\frac{\partial y_j^{l+1}}{\partial x_q} = S'(\eta_j^{l+1})\left(\Sigma_{i=1}^{n_l} w_{ij}^l \frac{\partial y_j^l}{\partial x_q}\right),$$

wherein $$\eta_j^{l+1} = \sum_{i=1}^{n_l} w_{ij}^l y_i^l(x) + \omega_{0j}^l$$

serves as an input to the $j^{th}$ node at the layer l+1, and S' is a derivative of the continuously differentiable activation function.

In an embodiment, the one or more hardware processors are further configured by the instructions to recursively compute, in a second direction, a partial derivative at each node among the one or more nodes of the plurality of network layers comprised in the FFN by using the equation:

$$\delta_j^l = \Sigma_{s=1}^{n_{l+1}} \frac{\partial y_r^L}{\partial \eta_s^{l+1}} \frac{\partial \eta_s^{l+1}}{\partial \eta_j^l} = \Sigma_{s=1}^{n_{l+1}} \delta_s^{l+1} w_{js}^l S'(\eta_j^l),$$

wherein $$y_r^L$$

is one or more $r^{th}$ outputs of the FFN, $$\delta_j^l$$

is the partial derivative of the one or more $r^{th}$ outputs ( $$(y_r^L)$$

of the FFN with reference to $$\eta_j^l$$

indicative of $$\frac{\partial y}{\partial \eta_j^l},$$

and $$\eta_s^{l+1}$$

is an output of $s^{th}$ node at the layer l+1.

In an embodiment, prior to recursively computing in the first direction and recursively computing, in the second direction, the one or more hardware processors are configured to execute a forward pass through the FFN to compute $$\eta_j^l,$$

and wherein $$\eta_j^l$$

serves as an input to the $j^{th}$ node at the layer l from the plurality of network layers of the FFN.

In an embodiment, the first direction and the second direction are different from each other.

In an embodiment, $$\partial \eta_s^{l+1} \text{ and } \partial \eta_j^l$$

are varied from one or more inputs at a final layer $$L(\eta_i^L)$$

to one or more corresponding inputs at a first layer $$M(\eta_i^M)$$

of the FFN in the second direction.

In an embodiment, an activation function at an input layer of the plurality of network layers comprised in the FFN is linear or non-linear.

In an embodiment, the feed-forward network (FFN) is used as at least one of a state equation and an observation equation in an Extended Kalman Filter (EKF).

In yet another aspect, there are provided one or more non-transitory machine-readable information storage mediums comprising one or more instructions which when executed by one or more hardware processors cause obtaining, a feed-forward network (FFN), wherein the FFN comprises a plurality of network layers, wherein each of the plurality of network layers comprises one or more nodes; and recursively computing in a first direction, a partial derivative at each node of the plurality of network layers comprised in the FFN by: identifying, via the one or more hardware processors, a recursive relationship between outputs associated with two successive network layers from the plurality of network layers, wherein the recursive relationship is identified using the equation:

$$y_j^{l+1}(x) = S\left(\sum_{i=1}^{n_l} w_{ij}^l y_i^l(x) + \omega_{0j}^l\right),$$

wherein $$y_j^{l+1}$$

is an output of $j^{th}$ node at layer l+1 from the plurality of network layers of the FFN, S is a continuously differentiable activation function, $n_l$ is number of nodes associated with a layer l from the plurality of network layers of the FFN, i is an iteration number, $$w_{ij}^l$$

is a weight between $i^{th}$ node of the layer l and $j^{th}$ node of the layer $$l+1,\ y_i^l$$

is an output of the $i^{th}$ node of the layer l, and $$\omega_{0j}^l$$

is a bias for $j^{th}$ node from the layer l; and applying a partial derivative function on the equation associated with the identified recursive relationship, with reference to a specific input $x_q$, to obtain a set of partial derivatives, wherein the partial derivative function is applied on the equation associated with the identified recursive relationship, using the equation:

$$\frac{\partial y_j^{l+1}}{\partial x_q} = S'\left(\eta_j^{l+1}\right)\left(\Sigma_{i=1}^{n_l} w_{ij}^l \frac{\partial y_j^l}{\partial x_q}\right),$$

wherein $$\eta_j^{l+1} = \sum_{i=1}^{n_l} w_{ij}^l y_i^l(x) + \omega_{0j}^l$$

serves as an input to the $j^{th}$ node at the layer l+1, and S' is a derivative of continuously differentiable activation function.

In an embodiment, the one or more instructions which when executed by the one or more hardware processors further cause recursively computing, in a second direction via the one or more hardware processors, a partial derivative at each node among the one or more nodes of the plurality of network layers comprised in the FFN by using the equation:

$$\delta_j^l = \Sigma_{s=1}^{n_{l+1}} \frac{\partial y_r^L}{\partial \eta_s^{l+1}} \frac{\partial \eta_s^{l+1}}{\partial \eta_j^l} = \Sigma_{s=1}^{n_{l+1}} \delta_s^{l+1} w_{js}^l S'\left(\eta_j^l\right),$$

wherein $$y_r^L$$

is one or more $r^{th}$ outputs of the FFN, $$\eta_j^l$$

is the partial derivative of the one or more $r^{th}$ outputs ( $$y_r^L$$

) of the FFN with reference to $$\eta_j^l$$

indicative of $$\frac{\partial y}{\partial \eta_j^l},$$

and $$\eta_s^{l+1}$$

is an output of $s^{th}$ node at the layer l+1.

In an embodiment, the steps of recursively computing, in the first direction and recursively computing, in the second direction, are preceded by executing a forward pass through the FFN to compute $$\eta_j^l,$$

and wherein $$\eta_j^l$$

serves as an input to the $j^{th}$ node at the layer l from the plurality of network layers of the FFN.

In an embodiment, the first direction and the second direction are different from each other.

In an embodiment, $$\partial \eta_s^{l+1} \text{ and } \partial \eta_j^l$$

are varied from one or more inputs at a final layer $$L\left(\eta_i^L\right)$$

to one or more corresponding inputs at a first layer M ( $\eta_i^M$

) of the FFN in the second direction.

In an embodiment, an activation function at an input layer of the plurality of network layers comprised in the FFN is linear or non-linear.

In an embodiment, the feed-forward network (FFN) is used as at least one of a state equation and an observation equation in an Extended Kalman Filter (EKF).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 depicts an exemplary flow chart illustrating a method for efficient Extended Kalman Filter (EKF) under feedforward approximation of a dynamical system, using the system of FIG. 1, in accordance with an embodiment of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As mentioned earlier, the inference problem in non-linear dynamical systems (NLDS) is to predict an unobserved state variable X (k), given the observations Y(k), initial state and inputs u(k). More specifically, it is posed as an optimal filtering problem where X (k0) is estimated in a recursive fashion, given observations and inputs up to some k0. To perform inference or predictions optimally (in a minimum mean-square error sense (MMSE)) under such NLDS models, exact methods are unavailable. The Extended Kalman filter (EKF) is one popular approximate inference solution which is very efficient run-time wise. It uses a linearized approximation (based on a Taylor series expansion) performed dynamically at each step and followed by linear KF application. The extended Kalman filter (EKF) is a general nonlinear version of the Kalman filter which linearizes about an estimate of the current mean and covariance. In the extended Kalman filter, the state transition and observation models do not need to be linear functions of the state but may instead be nonlinear differentiable functions.

The EKF is employed across domains like signal processing (tracking applications), robotics (estimate position of a robot), transportation, etc. Typically, the non-linear maps governing the state and observations equations are based on the physics of the domain. In situations where the physics-based models are not good enough, universal function approximators such as Neural Networks can be alternatively used if data is available to learn from. Extended Kalman Filter involves dynamic computation of the partial derivatives of the non-linear functions system maps with respect to the input or current state. Existing approaches have failed to perform recursive computations efficiently and exactly for such scenarios. Embodiments of the present disclosure provide system and method for exact and efficient forward and backward recursion-based algorithms.

Figure 1:
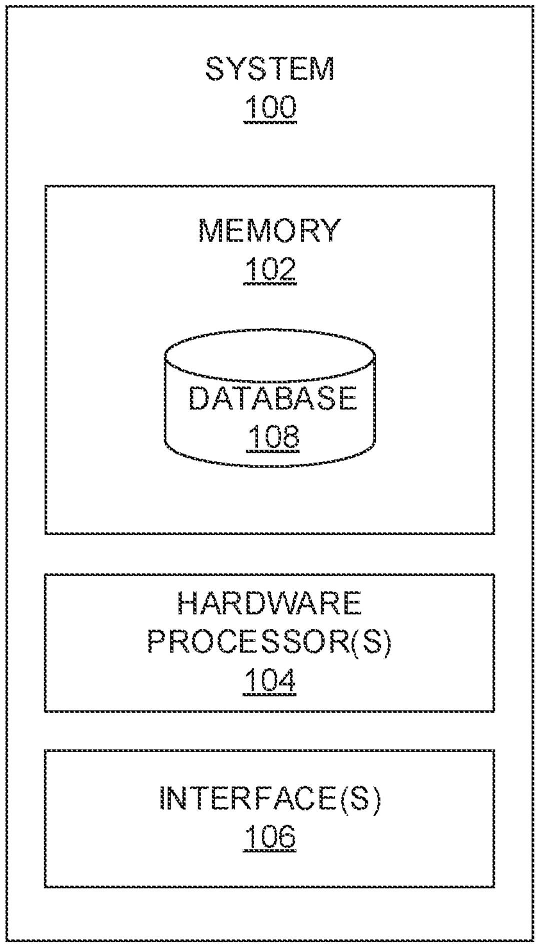
FIG. 1 depicts an exemplary system for efficient Extended Kalman Filter (EKF) under feedforward approximation of a dynamical system, in accordance with an embodiment of the present disclosure.
Figure 2:
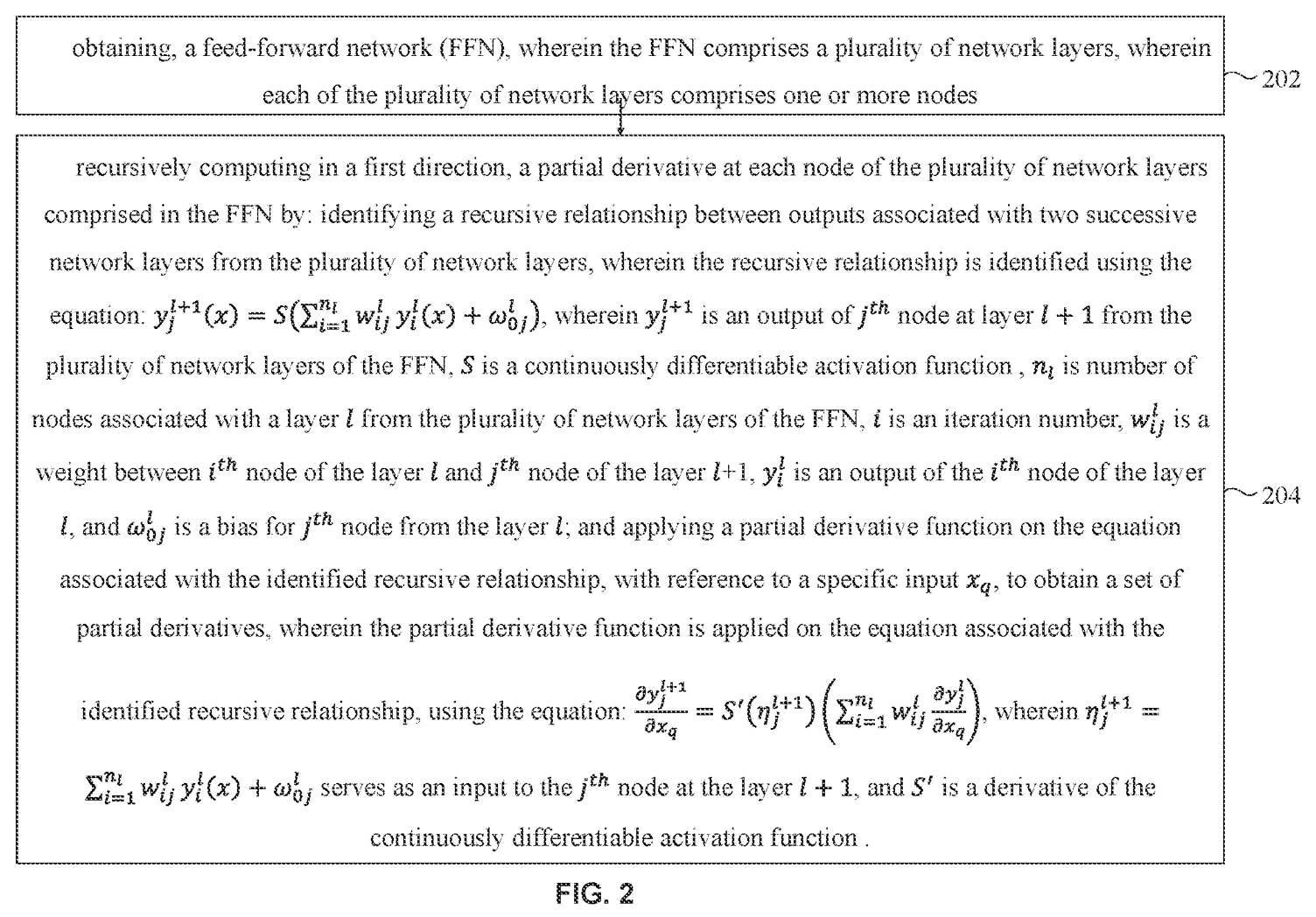
Figure 3:
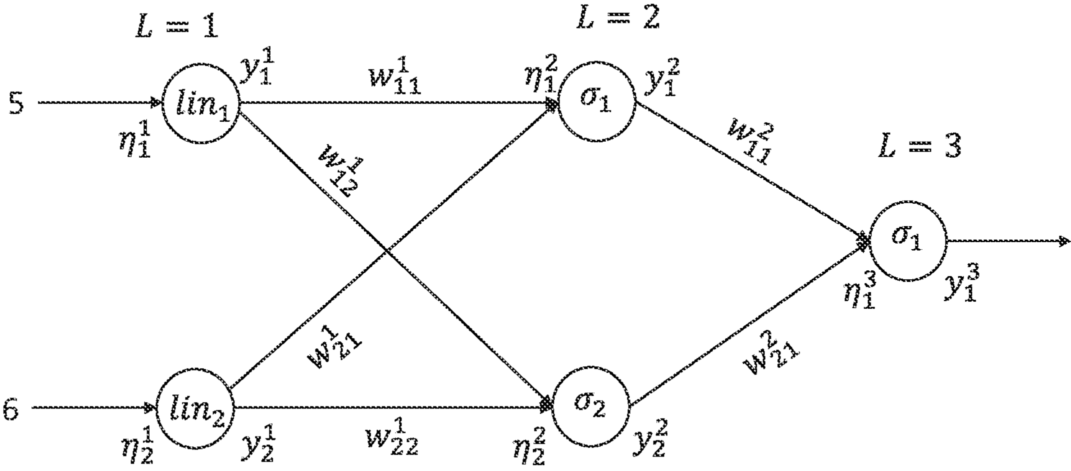
FIG. 3 depicts an exemplary diagram of a Feed-Forward Network as implemented by the system of FIG. 1, in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 depicts an exemplary system for efficient Extended Kalman Filter (EKF) under feedforward approximation of a dynamical system, in accordance with an embodiment of the present disclosure. In the present disclosure, the expression 'dynamical system' refers to a mathematical model capturing time-varying input-output entities with memory capacity, in one example embodiment. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information related to Feed-Forward Network (FFN), associated network layers and their nodes. The database 108 further comprises partial derivates estimated at each node of various network layers of the FFN, and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2, with reference to FIG. 1, depicts an exemplary flow chart illustrating a method for efficient Extended Kalman Filter (EKF) under feedforward approximation of a dynamical system, using the system 100 of FIG. 1, in accordance with an embodiment of the present disclosure. FIG. 3, with reference to FIGS. 1-2, depicts an exemplary diagram of a Feed-Forward Network as implemented by the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the flow diagram as depicted in FIG. 2, and the block diagram depicted in FIG. 3.

In an embodiment, at step 202 of the present disclosure, the one or more hardware processors 104 obtain, a feed-forward network (FFN). The FFN comprises a plurality of network layers wherein each of the plurality of network layers comprises one or more nodes. The architecture of the FFN is depicted in FIG. 3 which also illustrates various nodes and network layers comprised therein. The feed-forward network (FFN) is used as at least one of a state equation and an observation equation in an Extended Kalman Filter (EKF) of a dynamical system (or a Non-Linear Dynamic System (NLDS)), in one embodiment of the present disclosure. The state and observation equations for a Non-Linear Dynamic System (NLDS) can be written as below:

$$X(k) = F_k(X(k-1)) + w(k) \qquad \text{State equation}$$

$$Y(k) = G_k(X(k), u(k)) + v(k) \qquad \text{Observation equation}$$

In the present disclosure, the system 100 (or the one or more hardware processors 104 consider a L-layer feed-forward network (FFN) with a general activation function ($S(\cdot)$) at each node. $S(\cdot)$ could be a sigmoid or tanh function for instance. The input vector is denoted by x (of dimension $N_{in}$), whose $q^{th}$ component is denoted as $x_q$. Note the input vector from a general NLDS perspective (e.g., above equations) is the state vector X(k). The $l^{th}$ hidden layer has $n_l$ nodes. The weight connecting the $i^{th}$ node from layer l to the $j^{th}$ node of next layer namely l+1 is denoted by $$w_{ij}^l \cdot \omega_{0j}^l$$

involves the bias term to compute the input to the $j^{th}$ node of the $l+1^{th}$ layer. If a FFN approximation of vector-valued maps like $F_k(\cdot)$ and $G_k(\cdot)$ is used for a general NLDS, then the output layer has multiple outputs with a general activation. Therefore, $$\frac{\partial y_j^l}{\partial x_q}$$

is computed by the system 100, $\forall q=1, \ldots, N_{in}$ (or $n_1$), $j=1, \ldots, N_{ou}$ (or $n_L$). The closed form of computing the partial derivates is not easily scalable with the number of hidden layers. Hence the system and method of the present disclosure implement approaches for this which can be employed on feed-forward networks with arbitrary number of hidden layers. The approaches include: a forward recursion and a backward recursion, wherein these approaches are described and illustrated by way of examples below.

In an embodiment, at step 204 of the present disclosure, the one or more hardware processors 104 recursively compute in a first direction, a partial derivative at each node of the plurality of network layers comprised in the FFN. The first direction is a forward direction, in one example embodiment of the present disclosure. More specifically, at step 204, the partial derivative at each node of the plurality of network layers comprised in the FFN is computed by performing a forward recursion. The forward recursion to compute the partial derivative at each node of the plurality of network layers comprised in the FFN comprises identifying a recursive relationship between outputs associated with two successive network layers from the plurality of network layers, wherein the recursive relationship is identified using the equation:

$$y_j^{l+1}(x) = S\left(\sum_{i=1}^{n_l} w_{ij}^l y_i^l(x) + \omega_{0j}^l\right),$$

wherein $$y_j^{l+1}$$

is an output of $j^{th}$ node at layer l+1 from the plurality of network layers of the FFN, S is a continuously differentiable activation function, $n_l$ is number of nodes associated with a layer l from the plurality of network layers of the FFN, i is an iteration number, $$w_{ij}^l$$

is a weight between $i^{th}$ node of the layer l and $j^{th}$ node of the layer $$l+1, y_i^l$$

is an output of the $i^{th}$ node of the layer l, and $$\omega_{0j}^l$$

is a bias for $j^{th}$ node from the layer l; and applying a partial derivative function on the equation associated with the identified recursive relationship, with reference to a specific input $x_q$, to obtain a set of partial derivatives, wherein the partial derivative function is applied on the equation associated with the identified recursive relationship, using the equation:

$$\frac{\partial y_j^{l+1}}{\partial x_q} = S'(\eta_j^{l+1})\left(\Sigma_{i=1}^{n_l} w_{ij}^l \frac{\partial y_j^l}{\partial x_q}\right),$$

wherein $$\eta_j^{l+1} = \sum_{i=1}^{n_l} w_{ij}^l y_i^l(x) + \omega_{0j}^l$$

serves as an input to the $j^{th}$ node at the layer l+1, and S' is a derivative of the continuously differentiable activation function. In other words, the partial derivative function is applied on the equation identifying the identified recursive relationship, with reference to a specific input $x_q$, to obtain a set of partial derivatives. In an embodiment, the continuously differentiable activation function is an activation function (or a function and interchangeably used herein) such as a sigmoid activation function, a tanh activation function, an exponential activation function, and the like. Such examples of the continuously differentiable activation functions shall not be construed as limiting the scope of the present disclosure.

Algorithm: One forward pass through the FFN needs to be carried our first to compute $$\eta_j^l, \forall\, l,\, j.$$

The algorithm then implements the recursive computation of above equation which runs forward in l, the layer index. It not only needs the partial derivates at the previous layer but also $$\eta_j^{l+1},$$

the net input to the $j^{th}$ node of the l+1 layer. The above recursion starts at l=1. It is to be noted that $n_1=N_{in}$ and $$y_i^1(x) = x_i.$$

Hence $$\nabla y_i^1(x) = e_i,$$

where $e_i$ is a vector with a 1 in the $i^{th}$ coordinate and 0's elsewhere. The recursion ends with computation of all relevant partial derivates of $$y_i^L(\text{for } j = 1, \ldots, n_L).$$

Complexity for general NLDS: The initial forward pass through the FFN is $\mathcal{O}(N_w)$. Each partial derivative computation at a node j of layer (l+1) needs $n_l$ multiplications, where $n_l$ is the number of nodes in layer l (previous layer), which is also the number of weights incident on node j of layer (l+1). Hence, $\mathcal{O}(N_w)$ number of multiplications is needed to compute partial derivative of all outputs with respect to one component of the input. Since this is carried out for a partial derivative of each input component, the overall complexity of the above algorithm is $\mathcal{O}(N_{in}N_w)$. However, from above equation it is clear that each of the $N_{in}$ partial derivatives of all output variables can be computed in parallel. When $N_{in} \ll N_w$, then the complexity of parallel implementation can be $\mathcal{O}(N_w)$. Forward recursion first computes partial derivative (p.d.) of the outputs at layer 1 (or M) with respect to the input and then recursively compute the p.d. of the node outputs at layer l+1 with respect to the inputs in terms of the similar entities at layer l. This culminates in what is desired, the p.d. of the network outputs with respect to the network inputs. Using the above approach, a backward recursion computation is also defined and described herein.

Referring to FIGS. 3, L=1, 2, and 3, wherein L and l refer to layer of the FFN and may be interchangeably used herein. $lin_1$ and $lin_2$ be the linear nodes at layer 1 ($L_1$). Similarly, $\sigma_1$ and $\sigma_2$ be the nodes at layer 2 ($L_2$). For layer 3 ($L_3$), the output node is $\sigma_1$. Let $$\eta_1^1$$

be the input to node 1 of layer 1 ($L_1$) and $$\eta_2^1$$

be the input to node 2 of layer 1 ($L_1$). Similarly, $$\eta_1^2 \text{ and } \eta_2^2$$

are inputs to nodes 1 and 2 of layer 2 ($L_2$). Let $$\eta_1^3$$

be the input to node 1 of layer 3 ($L_3$). In the same above manner, $$y_1^1 \text{ and } y_2^1$$

are the outputs at nodes 1 and 2 of layer $$1(L_1)\cdot y_1^2 \text{ and } y_2^2$$

are the outputs at nodes 1 and 2 of layer $$2(L_2)\cdot y_1^3$$

is the output at node 1 of layer $$3(L_3)\cdot w_{11}^1$$

is the weight for node 1 from layer 1 ($L_1$) to node 1 of layer $$2(L_2)\cdot w_{12}^1$$

is the weight for node 1 from layer 1 ($L_1$) to node 2 of layer $$2(L_2),\text{ and } w_{21}^1$$

is the weight for node 2 from layer 1 ($L_1$) to node 1 of layer $$2(L_2)\cdot w_{22}^1$$

is the weight for node 2 from layer 1 ($L_1$) to node 2 of layer $$2(L_2)\cdot w_{11}^2$$

is the weight for node 1 from layer 2 ($L_2$) to node 1 of layer $$3(L_3)\cdot w_{21}^2$$

is the weight for node 2 from layer 2 ($L_2$) to node 1 of layer 3 ($L_3$). It is to be noted from FIG. 3 that layer 1 ($L_1$) has linear activation, and layer 2 ($L_2$) and layer 3 ($L_3$) have sigmoid activation. Let the weights assigned be as follows:

$$w_{11}^1 = 2,\ w_{21}^1 = 1,\ w_{11}^2 = 2,\ w_{12}^1 = 3,\ w_{22}^1 = 2,\text{ and } w_{21}^2 = 3.$$

Therefore, $$\eta_1^1 = 5 \text{ and } y_1^1 = 5, \text{ and } \eta_2^1 = 6, \text{ and } y_2^1 = 6.$$

$$\eta_1^2 = y_1^1 * w_{11}^1 + y_2^1 * w_{21}^1$$

$$\eta_1^2 = 5*2 + 5*1 = 16$$

$$\eta_2^2 = y_1^1 * w_{12}^1 + y_2^1 * w_{22}^1$$

$$\eta_2^2 = 5*3 + 6*2 = 27$$

$$y_1^2 = \sigma(\eta_1^2) = 0.99$$

$$y_2^2 = \sigma(\eta_2^2) = 0.99$$

$$\eta_1^3 = y_1^2 * w_{11}^2 + y_2^2 * w_{21}^2$$

$$\eta_1^3 = 0.99*2 + 0.99*3 = 4.95$$

$$y_1^3 = \sigma(\eta_1^3) = 0.993$$

To perform forward recursion, it is known by the system 100 that $$y_1^3 = \sigma(\eta_1^3) = \sigma\left(\Sigma_{i=1}^{n2} w_{i1}^2 y_i^2\right).\text{ Therefore, } \frac{\partial y_1^3}{\partial \eta_1^1} = \sigma_1 \eta_1^3 * \Sigma_{i=1}^{n2} w_{i1}^2 \frac{\partial y_1^2}{\partial \eta_1^1}$$

$$\frac{\partial y_1^3}{\partial \eta_1^1} = \sigma_1 \eta_1^3 * \left[ w_{11}^2 * \frac{\partial y_1^2}{\partial \eta_1^1} + w_{21}^2 * \frac{\partial y_2^2}{\partial \eta_1^1} \right]$$

$$\frac{\partial y_1^2}{\partial \eta_1^1} = \sigma_1 \eta_1^2 * \left[ w_{11}^2 * \frac{\partial y_1^1}{\partial \eta_1^1} + w_{21}^2 * \frac{\partial y_2^1}{\partial \eta_1^1} \right]$$

Since, $$y_1^1 =$$

linear activation of $$\frac{\partial y_1^1}{\partial \eta_1^1} = 1,$$

and since, $$y_2^1$$

independent of $$\frac{\partial y_2^1}{\partial \eta_1^1} = 0.$$

Therefore, $$\frac{\partial y_1^2}{\partial \eta_1^1} = 0.99 * 0.01 * 2 = 0.0198$$

Similarly, $$\frac{\partial y_2^2}{\partial \eta_1^1} = \sigma_1 \eta_2^2 * \left[ w_{12}^1 * \frac{\partial y_1^1}{\partial \eta_1^1} + w_{22}^1 * \frac{\partial y_2^1}{\partial \eta_1^1} \right]$$

$$\frac{\partial y_2^2}{\partial \eta_1^1} = 0.99 * 0.01 * 3 = 0.0297$$

Therefore, equation of $$\frac{\partial y_1^3}{\partial \eta_1^1}$$

is obtained (or becomes/derived) as follows:

$$\frac{\partial y_1^3}{\partial \eta_1^1} =$$

-continued $$0.993*0.007*[2*0.0198+3*0.0297]=0.993*0.008*0.1287=0.00089$$

Similarly, $$\frac{\partial y_1^3}{\partial \eta_2^1}=0.993*0.007*\left[w_{11}^2*\frac{\partial y_1^2}{\partial \eta_2^1}+w_{21}^2*\frac{\partial y_2^2}{\partial \eta_2^1}\right]$$

$$\frac{\partial y_1^2}{\partial \eta_2^1}=\sigma_1\eta_1^2*\left[w_{11}^1*\frac{\partial y_1^1}{\partial \eta_2^1}+w_{21}^1*\frac{\partial y_2^1}{\partial \eta_2^1}\right]$$

Since, $$y_2^1=$$

linear activation of $$\frac{\partial y_2^1}{\partial \eta_2^1}=1,$$

and since, $$y_1^1$$

is independent of $$\frac{\partial y_1^1}{\partial \eta_2^1}=0.$$

Therefore, $$\frac{\partial y_1^2}{\partial \eta_2^1}=0.99*0.01*1=0.0099$$

Similarly, $$\frac{\partial y_2^2}{\partial \eta_2^1}=\sigma_1\eta_2^2*\left[w_{12}^1*\frac{\partial y_1^1}{\partial \eta_2^1}+w_{22}^1*\frac{\partial y_2^1}{\partial \eta_2^1}\right]$$

$$\frac{\partial y_2^2}{\partial \eta_2^1}=0.99*0.01*2=0.0198$$

Therefore, equation of $$\frac{\partial y_1^3}{\partial \eta_2^1}$$

is obtained (or becomes/derived) as follows:

$$\frac{\partial y_1^3}{\partial \eta_2^1}=0.993*0.007*[2*0.0099+3*0.0198]=0.00054$$

Similarly, the one or more hardware processors 104 recursively compute, in a second direction via the one or more hardware processors, a partial derivative at each node among the one or more nodes of the plurality of network layers comprised in the FFN by using the equation:

$$\delta_j^l=\Sigma_{s=1}^{n_{l+1}}\frac{\partial y_r^L}{\partial \eta_s^{l+1}}\frac{\partial \eta_s^{l+1}}{\partial \eta_j^l}=\Sigma_{s=1}^{n_{l+1}}\delta_s^{l+1}w_{js}^l S'(\eta_j^l),$$

wherein $$y_r^L$$

is one or more $r^{th}$ outputs of the FFN, $$\delta_j^l$$

is the partial derivative of the one or more $r^{th}$ outputs ( $$y_r^L$$

) of the FFN with reference to $$\eta_j^l$$

indicative of $$\frac{\partial y}{\partial \eta_j^l},$$

and $$\eta_s^{l+1}$$

is an output of $s^{th}$ node at the layer $$l+1.\ \partial\eta_s^{l+1}\text{ and }\partial\eta_j^l$$

are varied from one or more inputs at a final layer $$L(\eta_i^L)$$

to one or more corresponding inputs at a first layer $$M(\eta_i^M)$$

of the FFN in the second direction. In an embodiment, an activation function at an input layer of the plurality of network layers comprised in the FFN is linear or non-linear in nature.

Algorithm: One forward pass through the FFN needs to be carried our first to compute $$\eta_j^l,$$

∀l,j. The algorithm then implements the recursive computation of above equation which runs backward in l, the layer index. It starts at the last layer L. By definition, $$\delta_j^l = \frac{\partial y_r^L}{\partial \eta_j^L}. \text{ Since } y_r^L = S(\eta_r^L), \partial_j^L = S'(\eta_r^L)$$

is obtained for j=r. While for $$j \neq r, \delta_j^L = 0.$$

Starting with this $$\delta_j^L, \delta_j^l$$

is recursively computed for all network layers. The derivative of the output $$y_r^L$$

is needed with respect to the inputs $x_j$, which is nothing but $$\delta_j^l = \frac{\partial y_r^L}{\partial x_j} = \frac{\partial y_r^L}{\partial \eta_j^1}.$$

It is to be noted that the activation function at the input layer is linear which means $$S'(x_i) = S'(\eta_i^1) = 1$$

during the last step of the above recursive computation specified in the above equation, specifically for j=1.

Complexity: The partial derivative computation of one of the network outputs involves one forward pass and one backward pass implementing the recursion of above-mentioned equation. Both the forward and backward passes are an $\mathcal{O}(N_w)$ computation, where $N_w$ is the number of weights across all network layers. But, since $n_L = N_{ou}$ output variables are available with the system 100, hence No, backward passes are necessary. Hence the overall complexity of a serial implementation is $\mathcal{O}(N_{ou}N_w)$. But from the above equation, each of these backward passes can be carried out in parallel. A parallel implementation where $N_{ou} << N_w$ would incur $\mathcal{O}(N_w)$ time. If $N_{in} = N_{ou}$, then it is observed that both the forward and backward recursions have the same complexity both in a serial/parallel implementation.

In the present disclosure, the second direction is a backward direction. Therefore, the one or more hardware processors 104 performs backward recursion on the FFN to obtain a set of partial derivates using the above equation (refer above second direction). In backward recursion, the system 100 needs to find $$\delta_1^1 \text{ and } \delta_2^1.$$

It is also known by the system 100 that $$\delta_1^3 = \frac{\delta y_1^3}{\delta \eta_1^3} \text{ and } y_1^3 = \sigma(\eta_1^3).$$

Therefore, $$\delta_1^3 = \sigma(\eta_1^3) * (1 - \sigma(\eta_1^3)) = 0.993 * 0.007 = 0.00693.$$

$$\delta_1^2 = \sum_{s=1}^{n_{l+1}} \delta_1^3 * w_{1s}^2 * \sigma^1(\eta_1^2)$$

Since, $n_{l+1}=1$

Therefore, $$\delta_1^2 = \delta_1^3 * w_{11}^2 * \sigma^1(\eta_1^2)$$

$$\delta_1^2 = 0.00693 * 2 * \sigma(\eta_1^2) * (1 - \sigma(\eta_1^2))$$

$$\delta_1^2 = 0.00693 * 2 * 0.99 * 0.01$$

$$\delta_1^2 = 0.0001372$$

Similarly, $$\delta_2^2 = \delta_1^3 * w_{21}^2 * \sigma^1(\eta_2^2)$$

$$\delta_2^2 = 0.00693 * 3 * \sigma(\eta_2^3) * (1 - \sigma(\eta_2^3))$$

$$\delta_2^2 = 0.00693 * 3 * 0.99 * 0.01$$

$$\delta_1^2 = 0.0002058$$

$$\text{So, } \delta_1^1 = \sum_{s=1}^{n_{l+1}} \delta_1^2 * w_{1s}^1 * S'(\eta_1^1)$$

Since the activation function is linear, it is known that (for layer 1 all nodes have linear activation)

$$S'(\eta_1^1) = 1,$$

where $$S(\eta_1^1) = y_1^1$$

is the linear activation function.

Therefore, $$\delta_1^1 = \delta_1^2 * w_{11}^1 * S'(\eta_1^1) + \delta_2^2 * w_{12}^1 * S'(\eta_1^1).$$

This is because $n_{l+1}=2$ since these are 2 nodes at layer 2 ($L_2$).

$$\text{So, } \delta_1^1 = 0.0001372 * 2 * 1 + 0.0002058 * 3 * 1$$

$$\delta_1^1 = 0.0002744 + 0.0006174$$

$$\delta_1^1 = 0008918$$

Similarly, $$\delta_2^1 = \delta_1^2 * w_{21}^1 * S'(\eta_2^1) + \delta_2^2 * w_{22}^1 * S'(\eta_2^1)$$

$$\delta_2^1 = 0.0001372 * 1 * 1 + 0.0002058 * 2 * 1$$

$$\delta_2^1 = 0.0001372 + 0.0004116$$

$$\delta_2^1 = 0.0005488$$

As mentioned earlier, the EKF is employed across domains like signal processing (tracking applications), robotics (estimate position of a robot), transportation, etc. For instance, the system and method of the present disclosure may be implemented in signal processing applications, (tracking applications), robotics (estimate position of a robot), transportation such as vehicle arrival time prediction, etc. Such applications or examples as described above shall not be construed as limiting the scope of the present disclosure. The Extended Kalman Filter involves getting the partial derivatives of the non-linear function with respect to the input. When the system maps are approximated using feed-forward approximators, EKF implementation can be carried out exactly, elegantly, and efficiently wherein the present disclosure implemented a forward and backward recursion-based algorithm to achieve this wherein the system maps for EKF are approximated using Feed Forward approximators. This allows the partial derivatives with respect to input to be calculated for the EKF with ease using 2 methods based on forward and backward recursion.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for an extended Kalman filter (EKF) under feed-forward approximation of a dynamical system, comprising:

obtaining, a feed-forward network (FFN) via one or more hardware processors, wherein the FFN comprises a plurality of network layers, wherein each of the plurality of network layers comprises one or more nodes, wherein the dynamical system corresponds to a mathematical model capturing time-varying input-output entities with memory capacity, and wherein the EKF is employed in domains comprising signal processing in tracking applications, estimate position of a robot, and prediction of vehicle arrival time;

recursively computing in a first direction, via the one or more hardware processors, a partial derivative at each node of the plurality of network layers comprised in the FFN by performing a forward recursion, comprises:

identifying, via the one or more hardware processors, a recursive relationship between outputs associated with two successive network layers from the plurality of network layers, wherein the recursive relationship is identified using the equation:

$$y_j^{l+1}(x) + S\left(\sum_{i=1}^{n_l} w_{ij}^l y_i^l(x) + \omega_{0j}^l\right),$$

wherein x is an input vector, $$y_j^{l+1}$$

is an output of $j^{th}$ node at layer l+1 from the plurality of network layers of the FFN, S is a continuously differentiable activation function, $n_l$ is number of nodes associated with a layer l from the plurality of network layers of the FFN, i is an iteration number, $$w_{ij}^l$$

is a weight between $i^{th}$ node of the layer l and $j^{th}$ node of the layer $$l+1,\ y_i^l$$

is an output of the $i^{th}$ node of the layer l, and $$\omega_{0j}^l$$

is a bias for $j^{th}$ node from the layer l; and applying a partial derivative function on the equation identifying the recursive relationship, with reference to a specific input $x_q$, to obtain a set of partial derivatives, wherein the partial derivative function is applied on the equation identifying the recursive relationship, using the equation:

$$\frac{\partial y_j^{l+1}}{\partial x_q} = S'\left(\eta_j^{l+1}\right)\left(\Sigma_{i=1}^{n_l} w_{ij}^l \frac{\partial y_j^l}{\partial x_q}\right),$$

wherein $$\eta_j^{l+1} = \sum_{l=1}^{n_l} w_{ij}^l y_i^l(x) + \omega_{0j}^l$$

serves as an input to the $j^{th}$ node at the layer l+1, and S' is a derivative of the continuously differentiable activation function, and recursively computing, in a second direction via the one or more hardware processors, a partial derivative at each node among the one or more nodes of the plurality of network layers comprised in the FFN by using the equation:

$$\delta_j^l = \sum_{s=1}^{n_{l+1}} \frac{\partial y_r^L}{\partial \eta_s^{l+1}} \frac{\partial \eta_s^{l+1}}{\partial \eta_j^l} = \Sigma_{s=1}^{n_{l+1}} \delta_s^{l+1} w_{js}^l S'\left(\eta_j^l\right),$$

wherein L and l refer to layer of the FFN, $$y_r^L$$

is one or more $r^{th}$ outputs of the FFN, $$\delta_j^l$$

is the partial derivative of the one or more $r^{th}$ outputs $$\left(y_r^L\right)$$

of the FFN, with reference to $$\eta_j^l$$

indicative of $$\frac{\partial y}{\partial \eta_j^l},$$

and $$\eta_s^{l+1}$$

is an output of $s^{th}$ node at the layer l+1, $$\eta_j^l$$

is a net input to the $j^{th}$ node of the l layer, and y is an output of the node at layer l from the plurality of network layers of the FFN, wherein the first direction is a forward direction and the second direction is a backward direction, and wherein a backward recursion is performed on the FFN to obtain the set of partial derivates.

2. The processor implemented method of claim 1, wherein the steps of recursively computing, in the first direction and recursively computing, in the second direction, are preceded by executing a forward pass through the FFN to compute $$\eta_j^l,$$

and wherein $$\eta_j^l$$

serves as an input to the $j^{th}$ node at the layer l from the plurality of network layers of the FFN.

3. The processor implemented method of claim 1, wherein the first direction and the second direction are different from each other.

4. The processor implemented method of claim 1, wherein $$\partial \eta_s^{l+1} \text{ and } \partial \eta_j^l$$

are varied from one or more inputs at a final layer L to one or more corresponding inputs at a first layer M of the FFN in the second direction.

5. The processor implemented method of claim 1, wherein the continuously differentiable activation function is an activation function comprising a sigmoid activation function, a tanh activation function, and an exponential activation function, and wherein the activation function at an input layer of the plurality of network layers comprised in the FFN is linear or non-linear.

6. The processor implemented method of claim 1, wherein the feed-forward network (FFN) is used as at least one of a state equation and an observation equation in the EKF.

7. A system for extended Kalman filter (EKF) under feed-forward approximation of a dynamical system, comprising:

a memory storing instructions;

one or more communication interfaces; and one or more hardware processors coupled to the memory via the one or more communication interfaces, wherein the one or more hardware processors are configured by the instructions to:

obtain, a feed-forward network (FFN), wherein the FFN comprises a plurality of network layers, wherein each of the plurality of network layers comprises one or more nodes, wherein the dynamical system corresponds to a mathematical model capturing time-varying input-output entities with memory capacity, and wherein the EKF is employed in domains comprising signal processing in tracking applications, estimate position of a robot, and prediction of vehicle arrival time;

recursively compute in a first direction, via the one or more hardware processors, a partial derivative at each node of the plurality of network layers comprised in the FFN by performing a forward recursion, comprises:

identifying a recursive relationship between outputs associated with two successive network layers from the plurality of network layers, wherein the recursive relationship is identified using the equation:

$$y_j^{l+1}(x) = S\left(\sum_{i=1}^{n_l} w_{ij}^l y_i^l(x) + \omega_{0j}^l\right),$$

wherein x is an input vector, $$y_j^{l+1}$$

is an output of $j^{th}$ node at layer l+1 from the plurality of network layers of the FFN, S is a continuously differentiable activation function, $n_l$ is number of nodes associated with a layer l from the plurality of network layers of the FFN, i is an iteration number, $$w_{ij}^l$$

is a weight between $i^{th}$ node of the layer l and $j^{th}$ node of the layer l+1, $$y_i^l$$

is an output of the $i^{th}$ node of the layer l, and $$\omega_{0j}^l$$

is a bias for $j^{th}$ node from the layer l; and applying a partial derivative function on the equation identifying the recursive relationship, with reference to a specific input $x_q$, to obtain a set of partial derivatives, wherein the partial derivative function is applied on the equation identifying the recursive relationship, using the equation:

$$\frac{\partial y_j^{l+1}}{\partial x_q} = S'\left(\eta_j^{l+1}\right)\left(\Sigma_{i=1}^{n_l} w_{ij}^l \frac{\partial y_j^l}{\partial x_q}\right),$$

wherein $$\eta_1^{l+1} = \sum_{i=1}^{n_l} w_{ij}^l y_i^l(x) + \omega_{0j}^l$$

serves as an input to the $j^{th}$ node at the layer l+1, and S' is a derivative of the continuously differentiable activation function, and recursively compute, in a second direction via the one or more hardware processors, a partial derivative at each node among the one or more nodes of the plurality of network layers comprised in the FFN by using the equation:

$$\delta_j^l = \sum_{s=1}^{n_{l+1}} \frac{\partial y_r^L}{\partial \eta_s^{l+1}} \frac{\partial \eta_s^{l+1}}{\partial \eta_j^l} = \Sigma_{s=1}^{n_{l+1}} \delta_s^{l+1} w_{js}^l S'(\eta_j^l),$$

wherein L and I refer to layer of the FFN, $$\gamma_r^L$$

is one or more $r^{th}$ outputs or the FFN, $$\delta_j^l$$

is the partial derivative of the one or more $r^{th}$ outputs $$(y_r^L)$$

of the FFN, with reference to $$\eta_j^l$$

indicative of $$\frac{\partial y}{\partial \eta_j^l},$$

and $$\eta_s^{l+1}$$

is an output of $s^{th}$ node at the layer l+1, $$\eta_j^l$$

is a net input to the $j^{th}$ node of the l layer, and y is an output of the node at layer l from the plurality of network layers of the FFN, wherein the first direction is a forward direction and the second direction is a backward direction, and wherein a backward recursion is performed on the FFN to obtain the set of partial derivates.

8. The system of claim 7, wherein the steps of recursively computing, in the first direction and recursively computing, in the second direction, are preceded by executing a forward pass through the FFN to compute $$\eta_j^l,$$

and wherein $$\eta_j^l$$

serves as an input to the $j^{th}$ node at the layer l from the plurality of network layers of the FFN.

9. The system of claim 7, wherein the first direction and the second direction are different from each other.

10. The system of claim 7, wherein $$\partial \eta_s^{l+1} \text{ and } \partial \eta_j^l$$

are varied from one or more inputs at a final layer L to one or more corresponding inputs at a first layer M of the FFN in the second direction.

11. The system of claim 7, wherein the continuously differentiable activation function is an activation function comprising a sigmoid activation function, a tanh activation function, and an exponential activation function, and wherein the activation function at an input layer of the plurality of network layers comprised in the FFN is linear or non-linear.

12. The system of claim 7, wherein the feed-forward network (FFN) is used as at least one of a state equation and an observation equation in the EKF.

13. One or more non-transitory machine-readable information storage mediums comprising one or more instructions which when executed by one or more hardware processors cause:

obtaining, a feed-forward network (FFN), wherein the FFN comprises a plurality of network layers, wherein each of the plurality of network layers comprises one or more nodes, wherein an extended Kalman filter (EKF) under feed-forward approximation of a dynamical system, is employed in domains comprising signal processing in tracking applications, estimate position of a robot, and prediction of vehicle arrival time, wherein the dynamical system corresponds to a mathematical model capturing time-varying input-output entities with memory capacity;

recursively computing in a first direction, via the one or more hardware processors, a partial derivative at each node of the plurality of network layers comprised in the FFN by performing a forward recursion, comprises:

identifying, via the one or more hardware processors, a recursive relationship between outputs associated with two successive network layers from the plurality of network layers, wherein the recursive relationship is identified using the equation:

$$y_j^{l+1}(x) = S\left(\sum_{i=1}^{n_l} w_{ij}^l y_i^l(x) + \omega_{0j}^l\right),$$

wherein x is an input vector, $$y_j^{l+1}$$

is an output of $j^{th}$ node at layer l+1 from the plurality of network layers of the FFN, S is a continuously differentiable activation function, $n_l$ is number of nodes associated with a layer l from the plurality of network layers of the FFN, i is an iteration number, $$w_{ij}^l$$

is a weight between $i^{th}$ node of the layer l and $j^{th}$ node of the layer l+1, $$y_i^l$$

is an output or the $i^{th}$ node of the layer l, and $$\omega_{0j}^l$$

is a bias for $j^{th}$ node from the layer l; and applying a partial derivative function on the equation identifying the recursive relationship, with reference to a specific input $x_q$, to obtain a set of partial derivatives, wherein the partial derivative function is applied on the equation identifying the recursive relationship, using the equation:

$$\frac{\partial y_j^{l+1}}{\partial x_q} = S'(\eta_j^{l+1})\left(\Sigma_{i=1}^{n_l} w_{ij}^l \frac{\partial y_j^l}{\partial x_q}\right),$$

wherein $$\eta_j^{l+1} = \sum_{i=1}^{n_l} w_{ij}^l y_i^l(x) + \omega_{0j}^l$$

serves as an input to the $j^{th}$ node at the layer l+1, and S' is a derivative of the continuously differentiable activation function, and recursively computing, in a second direction via the one or more hardware processors, a partial derivative at each node among the one or more nodes of the plurality of network layers comprised in the FFN by using the equation:

$$\delta_j^l = \sum_{s=1}^{n_{l+1}} \frac{\partial y_r^L}{\partial \eta_s^{l+1}} \frac{\partial \eta_s^{l+1}}{\partial \eta_j^l} = \Sigma_{s=1}^{n_{l+1}} \delta_s^{l+1} w_{js}^l S'(\eta_j^l),$$

wherein L and I refer to layer of the FFN, $$y_r^L$$

is one or more $r^{th}$ outputs of the FFN, $$\delta_j^l$$

is the partial derivative of the one or more $r^{th}$ outputs $$(y_r^L)$$

of the FFN, with reference to $$\eta_j^l$$

indicative of $$\frac{\partial y}{\partial \eta_j^l},$$

and $$\eta_s^{l+1}$$

is an output of $s^{th}$ node at the layer l+1, $$\eta_j^l$$

is a net input to the $j^{th}$ node of the I layer, and y is an output of the node at layer I from the plurality of network layers of the FFN, wherein the first direction is a forward direction and the second direction is a backward direction, and wherein a backward recursion is performed on the FFN to obtain the set of partial derivates.

14. The one or more non-transitory machine-readable information storage mediums of claim 13, wherein the steps of recursively computing, in the first direction and recursively computing, in the second direction, are preceded by executing a forward pass through the FFN to compute $$\eta_j^l,$$

and wherein $$\eta_j^l$$

serves as an input to the $j^{th}$ node at the layer l from the plurality of network layers of the FFN.

15. The one or more non-transitory machine-readable information storage mediums of claim 13, wherein the first direction and the second direction are different from each other.

16. The one or more non-transitory machine-readable information storage mediums of claim 13, wherein $$\partial \eta_s^{l+1} \text{ and } \partial \eta_j^l$$

are varied from one or more inputs at a final layer L to one or more corresponding inputs at a first layer M of the FFN in the second direction.

17. The one or more non-transitory machine-readable information storage mediums of claim 13, wherein the continuously differentiable activation function is an activation function comprising a sigmoid activation function, a tanh activation function, and an exponential activation function, wherein the activation function at an input layer of the plurality of network layers comprised in the FFN is linear or non-linear, and wherein the feed-forward network (FFN) is used as at least one of a state equation and an observation equation in the EKF.

* * * * *